United States Patent [19]

Meador et al.

[11] Patent Number: 4,785,247

[45] Date of Patent: Nov. 15, 1988

[54] DRILL STEM LOGGING WITH ELECTROMAGNETIC WAVES AND ELECTROSTATICALLY-SHIELDED AND INDUCTIVELY-COUPLED TRANSMITTER AND RECEIVER ELEMENTS

[75] Inventors: Richard A. Meador; Larry W. Thompson, both of Spring; William R. Grayson, Houston, all of Tex.

[73] Assignee: NL Industries, Inc., New York, N.Y.

[21] Appl. No.: 36,170

[22] Filed: Apr. 6, 1987

Related U.S. Application Data

[63] Continuation of Ser. No. 508,360, Jun. 27, 1983, abandoned.

[51] Int. Cl.$^4$ .............................................. G01V 3/30
[52] U.S. Cl. ..................................... 324/338; 324/341
[58] Field of Search ...................... 324/323, 338–343, 324/356, 359

[56] References Cited

U.S. PATENT DOCUMENTS

| | | | |
|---|---|---|---|
| 2,411,696 | 11/1946 | Silverman et al. | 324/369 X |
| 2,964,698 | 12/1960 | Lehmberg | 324/339 |
| 3,124,742 | 3/1964 | Schneider | 324/339 X |
| 3,249,858 | 5/1966 | Gouilloud | 324/339 |
| 3,305,771 | 2/1967 | Arps | 324/342 |
| 3,408,561 | 10/1968 | Redwine et al. | 324/342 |
| 3,551,797 | 12/1970 | Gouilloud et al. | 324/338 |
| 3,753,185 | 8/1973 | Mahan | 324/327 X |
| 3,891,916 | 6/1975 | Meador et al. | 324/341 |
| 4,107,598 | 8/1978 | Meador et al. | 324/341 |
| 4,209,747 | 6/1980 | Huchital | 324/338 |
| 4,319,191 | 3/1982 | Meador et al. | 324/341 |
| 4,511,843 | 4/1985 | Thoraval | 324/338 |
| 4,514,693 | 4/1985 | Meador | 324/341 X |
| 4,536,714 | 8/1985 | Clark | 324/338 |
| 4,553,097 | 11/1985 | Clark | 324/338 |

OTHER PUBLICATIONS

Grubb et al., "Borehole Measurements of . . . in the 300 KHz to 25 MHz Frequency Range", Radio Science, vol. 1, No. 4, pp. 275–283, Apr. 1976.

Primary Examiner—Gerard R. Strecker
Attorney, Agent, or Firm—Browning, Bushman, Zamecki & Anderson

[57] ABSTRACT

An apparatus and method for measuring formation parameters by transmitting and receiving electromagnetic signals by antennas disposed in recesses in a tubular housing member and including apparatus for reducing the coupling of electrical noise into the system resulting from conducting elements located adjacent the recesses and housing. More particularly, a method and apparatus employing electrostatic, but not magnetic, shielding of the low impedance antenna systems and inductive signal coupling to enhance the signal at the receiver is disclosed. This system is capable of measuring formation parameters in the presence of conducting bodies, e.g., the drill string, permitting incorporation of the apparatus in a measuring while drilling (MWD) logging system. In a particular embodiment, high frequency electromagnetic energy is used to measure formation resistivity. Small low impedance coils are arranged in the wall or around the outer circumferential surface of a steel drill collar and spaced from the surface a minimum distance to allow efficient propagation and reception. The low impedance receiver antennas are substantially electrostatically, but not magnetically, shielded and include inductive current coupling devices to further improve the signal. In a preferred embodiment, the coils are circularly configured about the collar and longitudinally spaced thereon to serve as transmitting and receiving elements which together with associated circuit components employ high frequency electromagnetic wave propagation techniques to measure formation parameters. The received signals are phase shifted and amplitude attenuated as they pass through the formation, and formation parameters are determined by detecting variations in travel time and attenuation between longitudinally spaced receivers.

30 Claims, 5 Drawing Sheets

*FIG. 2A*
*FIG. 2B*
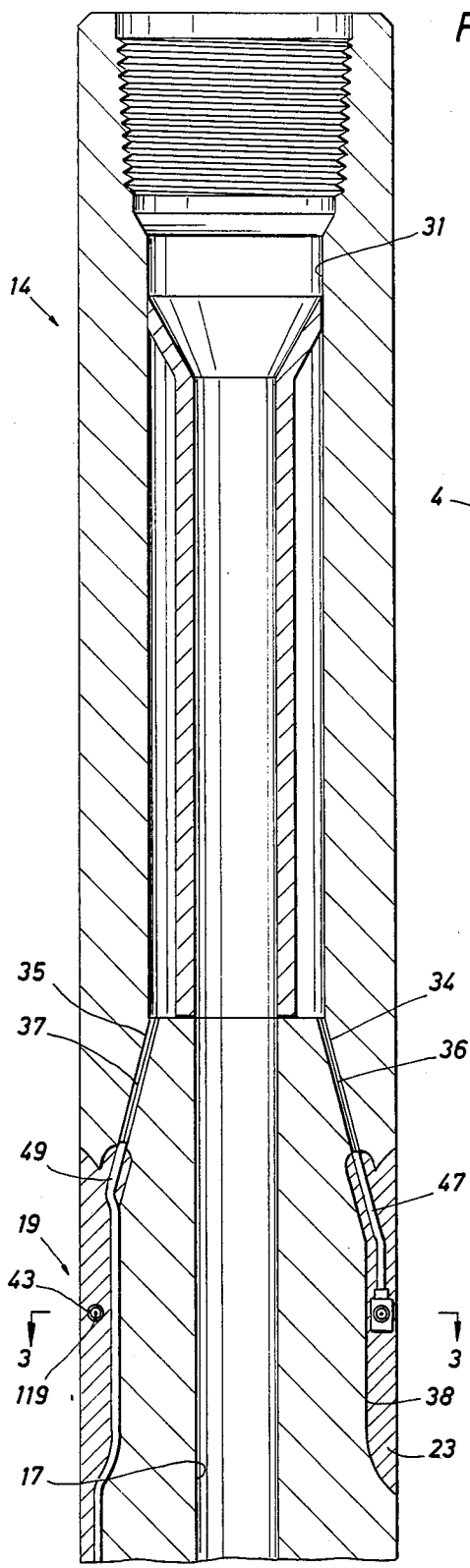
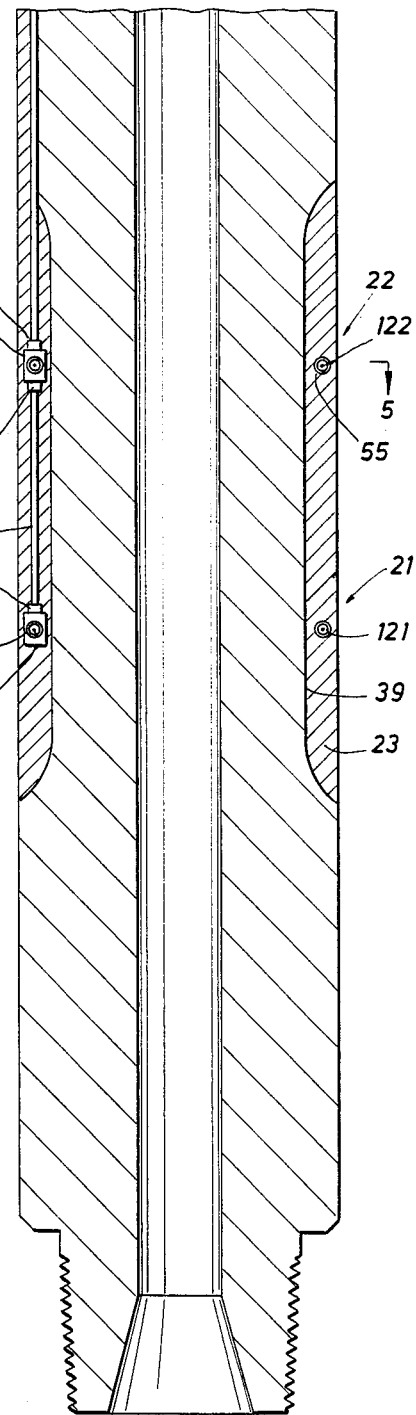

FIG. 2C
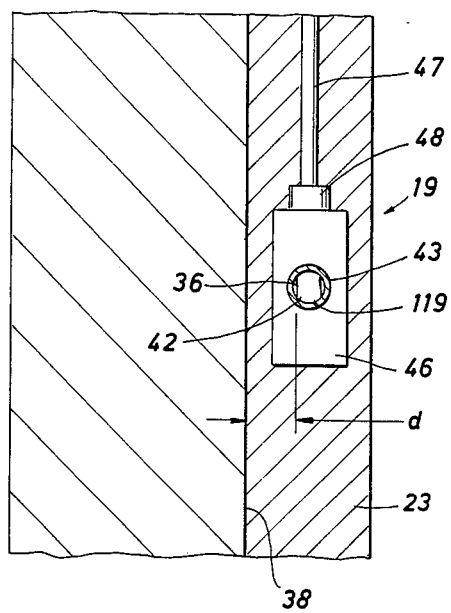
FIG. 2D
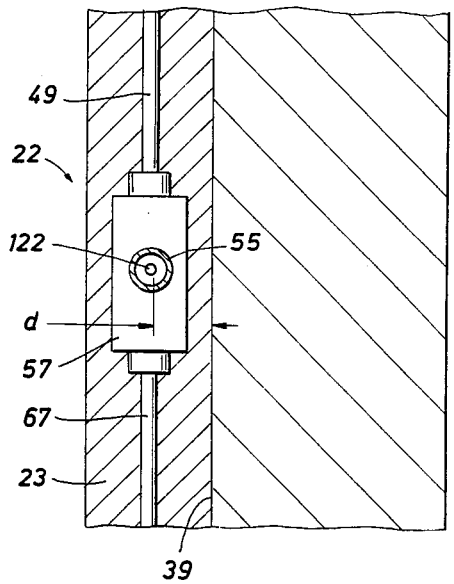
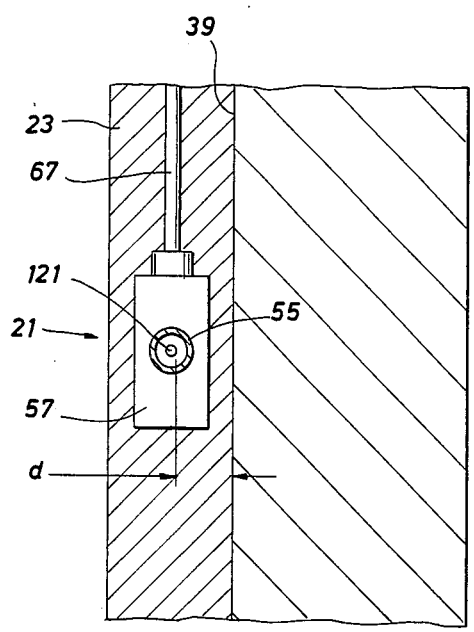
FIG. 2E

FIG. 6
FIG. 7
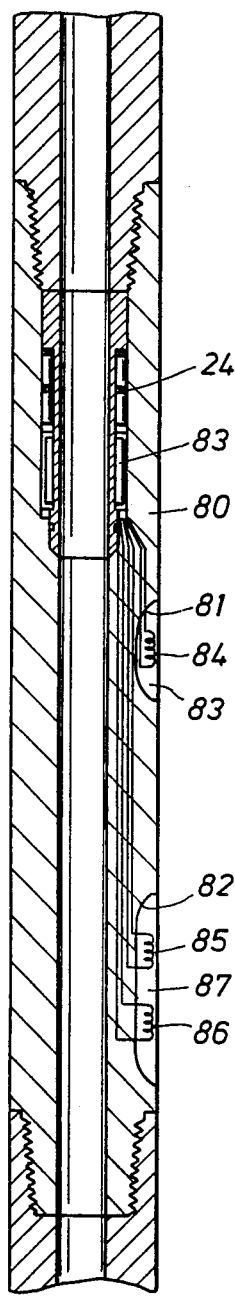
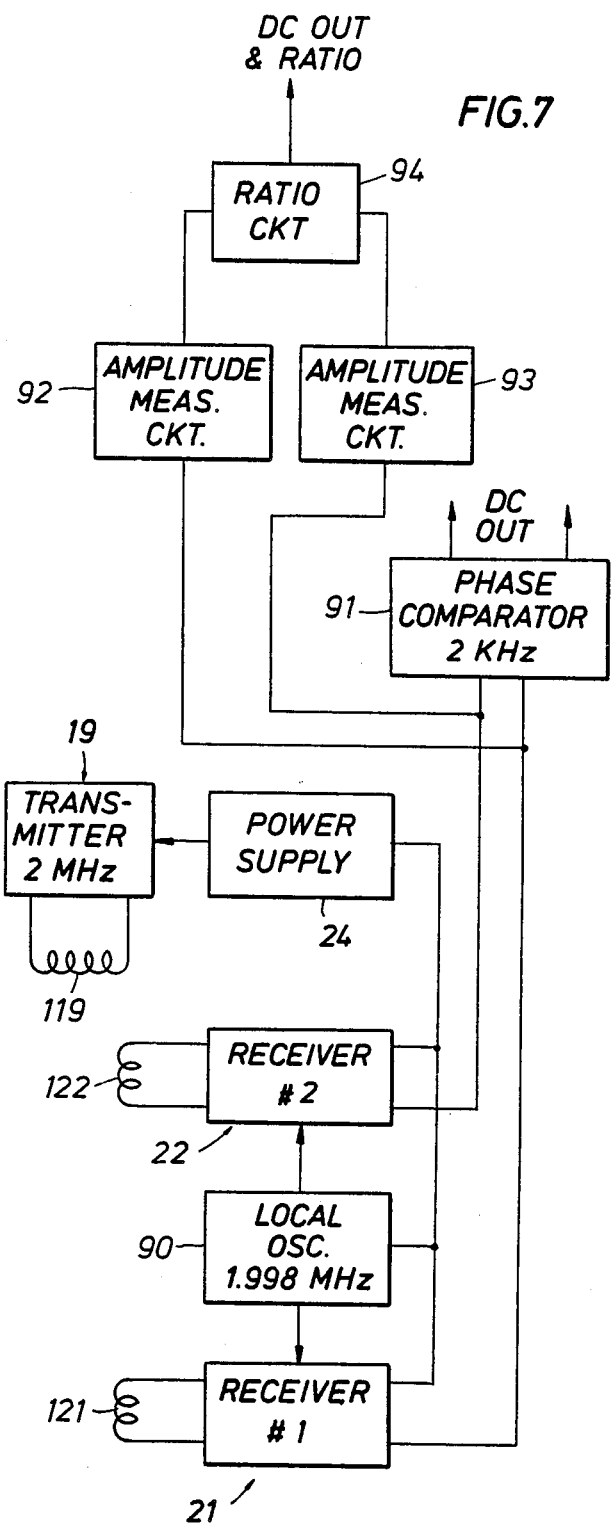

DRILL STEM LOGGING WITH ELECTROMAGNETIC WAVES AND ELECTROSTATICALLY-SHIELDED AND INDUCTIVELY-COUPLED TRANSMITTER AND RECEIVER ELEMENTS

This is a continuation of application Ser. No. 508,360 filed June 27, 1983, abandoned.

BACKGROUND OF THE INVENTION

1. Field of the Invention

The present invention relates generally to an apparatus and method for measuring formation parameters by transmitting and receiving electromagnetic signals by means disposed in recesses in a tubular housing member and including means for reducing the capacitive coupling of noise from conducting elements located adjacent the recess and housing means. More particularly, a method and apparatus is disclosed employing electrostatic shielding of the antennas and ground loop isolation to reduce noise and minimum spacing of antennas from conductive elements adjacent the recesses and inductive current coupling means to enhance the signal level at the receiving means whereby the system is capable of use in a drill string to make measurements while drilling.

2. Description of the Background

It is desirable for many reasons to transmit electrical signals through the earth as a propagating medium, and receive the signals at a location spaced from the transmitter. Such a signal propagation system is, for example, used both for the determination of various parameters associated with the propagating medium and for communication purposes. These systems are often used in the investigation of the environment surrounding a borehole, and in particular, the surrounding earth formations. Various types of borehole logging systems are available to perform these investigations. A class of these systems utilize electromagnetic field phenomena to obtain data from the environment surrounding the borehole.

One type of electromagnetic logging is electrode logging which utilizes an electric field in the surrounding formation to produce a measure of the conductivity of the formation. A conductive mud is necessary for proper use of this system, thus rendering the system inoperative with oil base muds. Inductive logging is another type of electromagnetic logging which uses a magnetic field in the formation to produce a secondary current flow in the formation. The secondary current flow sets up a second magnetic field which induces current in receiving coils positioned in the borehole. The induced current in the receiving coil or coils is proportional to the secondary current flow in the formation and thus is directly proportional to the conductivity or inversely proportional to the resistivity of the surrounding formation. Electromagnetic wave propagation affords still another logging system for investigating the environment around a borehole and is the subject of the present invention.

An electromagnetic logging system of the wave propagation type is disclosed in Gouilloud et al, U.S. Pat. No. 3,551,797, which is incorporated herein by reference. This patent discloses a wireline system having a transmitter and receivers for measuring formation parameters, and utilizing phase comparison and amplitude. However, the Gouilloud wireline system is not usable in a measuring while drilling (hereinafter, "MWD") configuration. The Gouilloud patent discloses a non-conductive sonde of insufficient strength to operate in a drill string characterized by a mass of steel and more particularly drill collars in the vicinity of the drill bit and measurement apparatus. U.S. Pat. Nos. 4,107,597 and 4,185,238 also show electromagnetic wave propatation systems for use in wireline apparatus. U.S. Pat. No. 4,107,597 describes the wireline sonde as being constructed of a non-conductive material which is customary in such devices in order to accommodate the use of electromagnetic transmitting and receiving apparatus. The U.S. Pat. No. 3,079,550 shows an induction logging system for measuring similar formation parameters, utilizing lower frequencies and requiring a conductive mud in the borehole.

Both the electrode and induction systems, heretofore the primary methods for measuring formation resistivity, as well as the wireline systems using wave propagation, have certain drawbacks, particularly for application in a MWD configuration. An electrode system requires insulation of the drill string from the several transmitting and receiving electrodes in the system. This normally requires a special insulation coating to be applied over the steel drill string in the vicinity of the electrodes. This coating is expensive to maintain and is of questionable reliability. An induction logging system normally operates at 20 KHz and requires large diameter coils to obtain the necessary coupling. In a MWD configuration, inductive logging coils must be mounted in or about a drill collar in a drill string and that portion of the collar must be non-conductive. Non-conductive collars are difficult to build while maintaining the structural integrity and strength necessary to their use in a drill string. In this regard thicker collar walls and improved mechanical strength characteristics are obtainable in a collar by reducing the size of the coils. In order, however, to achieve the necessary coupling between spaced coils which are small, the operating frequency of the system must be increased. As the frequency is raised from 20 KHz, wave propagation begins and standard induction is no longer effective. The wireline electromagnetic wave propagation devices described above do not use a sonde assembly having sufficient structural integrity and strength to be incorporated in a drill string or noise reduction and signal enhancement techniques which enable reliable performance in an MWD environment.

The unsuitability of the above systems for incorporation into a drill string to measure formation parameters using electromagnetic signals in a measurement while drilling configuration is clear. The electrode system discussed above is limited to use with electrically conducting, water base muds. Induction logging systems utilize large coil configurations which require too much space on a drill collar to maintain the strength and fluid communication characteristics described above. Smaller coils require the use of higher frequencies to insure proper coupling between coils, and the higher frequencies propagate in the formation. Thus, standard induction measurements cannot be utilized in MWD systems. The lack of structural integrity and ineffective signal reception are problems associated with these systems. The art has long sought a means of overcoming these disadvantages useful in providing an effective apparatus using electromagnetic signals to measure formation parameters while drilling.

SUMMARY OF THE INVENTION

The present invention is directed to a method and apparatus for reducing the coupling of noise from conducting elements near the receiving means and enhancing electromagnetic signal reception suitable for measuring formation parameters about a drill hole and particularly useful for making such measurements while drilling by incorporation of the apparatus in the drill string. The apparatus of the present invention is characterized by having transmitting means, receiving means and noise reduction means disposed about a tubular housing means preferably a steel drill collar member, which is likely capable of conducting an electrical current. The present invention provides a new and improved borehole logging system for use in a MWD configuration and utilizing electromagnetic wave propagation while maintaining the mechanical strength and fluid flow characteristics of the drill string.

A presently preferred embodiment of the invention includes a tubular housing member having the essential mechanical and strength characteristics of a drill collar and which is likely to be capable of conducting an electrical current. The transmitting, receiving and noise reducing means of the present system are arranged on or about the drill collar member. One or more recesses are formed in the wall of the drill collar to house the transmitting and receiving components, leaving a full longitudinal path through the drill collar to thereby permit unobstructed flow of the drilling fluids through the pipe string. The transmitting and receiving antennas are preferably arranged in a generally circular array about the exterior of the tubular member. Preferably the receiving antenna comprises a low impedance antenna electrically insulated from the tubular member. Most preferably, an antenna having an impedance of less than about 100 ohms, such as a single loop antenna, is disposed annularly about the tubular member. Transmitting and receiving antennas of the system are arranged in one or more recesses formed in the peripheral surface of the drill collar.

Molded sleeves of insulative and wear resistant material encapsulate the antennas in the recesses and fill the spaces between the outer surface profile of the collar and the coils. Two receiving antennas are preferably employed and are located on the same axial side of the transmitting antenna. More preferably, the longitudinal distance between each pair of antennas, including transmitting and receiving antennas, is different.

The capacitive coupling of noise from conducting elements located adjacent the recess means and housing means, e.g., from a conducting drilling fluid, the drill string or a conducting housing is reduced, preferably minimized, by use of a low impedance receiver antenna, electrostatic but not magnetic shielding of the antenna, ground loop current isolation and inductive current coupling of the received signal from the antenna to the data handling means. Preferably, the low impedance antenna is substantially shielded, i.e., about ninety percent or more shielded.

The inductive current coupling means is preferably an impedance matching torodial ferrite core transformer and comprises a secondary coil used to pick up the signal from the receiver antenna. The transformer coil is wound on a ring of low magnetic permeability, preferably ferrite, which in turn encircles an annular antenna loop about the collar. Each secondary transformer coil couples its respective antenna coil to a receiver circuit. Transmitter and receiver circuits as well as power supplies are arranged in the wall of the collar.

In an exemplary system employing the present invention, a transmitting means and two spaced receiving means with associated circuitry detect phase change in a wave propagated through the formation surrounding the borehole between the spaced receiver antennas. The required comparison circuitry is disposed in the wall of the tubular housing member in this system. The present apparatus is also capable of measuring amplitude ratios as well as phase changes relative to spaced receiver antennas.

The method of the present invention comprises transmitting and receiving electromagnetic signals with a device as described above and preferably incorporated into a drill string for measurement while drilling. The method further comprises reducing the capacitive coupling of noise into the system and enhancing the signal at the receiving means with the shielded, low impedance antenna and inductive current coupling means disclosed.

The method and apparatus of the present invention have many advantages. Capacitive coupling of signals transmitted along the tubular housing member or through adjacent conducting elements, e.g., the drill string or the drilling mud, is reduced, thus enhancing reception of the signal from the surrounding formation. A device having sufficient structural integrity and strength for incorporation into a drill string is provided. Accordingly, the method and apparatus of the present invention make possible the measurement of formation parameters using electromagnetic signals in a measurement while drilling configuration. These and other meritorious features and advantages of the present invention will be more fully appreciated from the following detailed description and claims.

BRIEF DESCRIPTION OF THE DRAWINGS

Other features and intended advantages of the invention will be more readily apparent by reference to the following detailed description in connection with the accompanying drawings wherein:

FIGS. 2A and 2B combined provide a schematic side elevational view in cross-section of a drill collar including a logging system in accord with one embodiment of the present invention, FIG. 2A illustration the top portion of the apparatus and FIG. 2B the bottom portion;

FIGS. 2C, 2D and 2E, respectively, illustrate, in more detail, schematic side elevational views of the transmitting antenna, the first receiving antenna and the second receiving antenna;

FIG. 6 is a schematic view of an alternative embodiment of a logging system in accord with the present invention; and FIG. 7 is a schematic block diagram of a circuit for processing a signal received in accord with the present invention;

Figure 1:
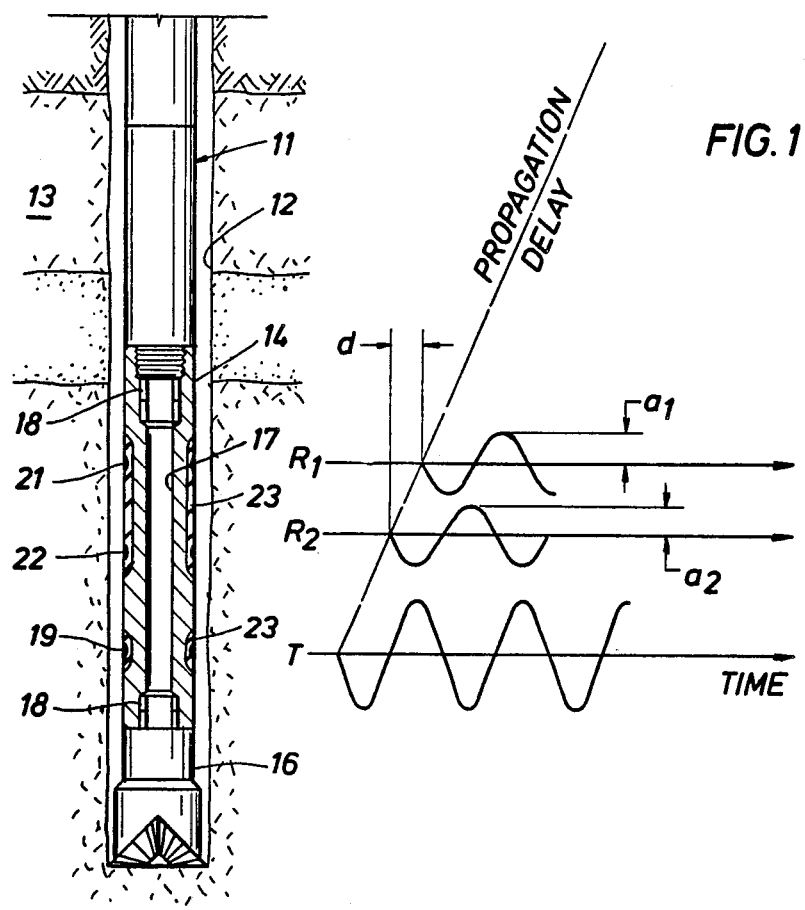
FIG. 1 is a schematic view of a drill string in a borehole with a section of drill collar incorporating a measurement while drilling logging system in accord with one embodiment of the present invention included in the drill string; also illustrated is a schematic analysis of wave propagation in a surrounding formation viewed relative to the transmitting and receiving means spacing on the collar.

While the invention will be described in connection with a presently preferred embodiment, it will be understood that it is not intended to limit the invention to that embodiment. On the contrary, it is intended to cover all alternatives, modifications and equivalents as may be included within the spirit of the invention as defined in the appended claims.

DESCRIPTION OF THE PREFERRED EMBODIMENT

In drilling wells, the hourly cost of a drilling rig is very large and, therefore, it is desirable to minimize the time during which the equipment is not drilling due to mechanical failure of the drill string. Thus, maintenance of the mechanical integrity of the drill string is of primary concern in any measuring while drilling (MWD) logging system.

By definition, an MWD system seeks to provide real-time measurement of formation parameters and, therefore, measuring instrumentation should be positioned in the drill string near the bit, an extremely hostile physical environment. During drilling operations there are two characteristics of the drill string which are of prime importance: the integrity of the longitudinal conduit through the string for the flow of drilling fluids, and the physical strength of the components of the string to resist failure under stress. MWD logging systems include very delicate instrumentation which must be designed to function reliably and very precisely as an integral part of the mass of steel hardware required to survive the tremendous heat, pressures and stresses near a working drill bit. MWD instrumentation must be placed in steel drill collars which form part of the drill string near the bit. Such collars are basically cylinders of solid steel having an axial tubular conduit for the passage of circulating drilling fluids down the string to the bit. Such an instrumentation carrier provides many design constraints on both the packaging and the function of MWD systems. This is especially true in the case of the system of the present invention where the instrumentation is a radio frequency transmitter and receiver which must broadcast and receive and measure low-power electromagnetic signals in a very noisy electrical environment. Transmit and receive antennas are part of the present invention and are required to be mounted very close to a highly conductive mass of solid steel. These design constraints require a careful consideration of all the factors which affect the function of an electromagnetic logging tool to produce an accurate measurement of the formation parameters of interest.

There are three formation parameters which affect an electromagnetic wave in an earth formation, whether the wave communicates from one point to another by induction or by propagation. These three formation parameters are the conductivity (resistivity) the magnetic susceptibility and dielectric constant. Conductivity provides an indication of the energy absorbing characteristics of the medium, while magnetic susceptibility and dielectric constant each give a measure of the energy storing capacity of a material. Conductivity, which is a commonly measured parameter in well logging operations, exhibits wide variations in value for earth materials and strongly affects all electromagnetic waves. The magnetic susceptibility of most earth materials has relatively little effect on electromagnetic waves. The dielectric constant shows considerable variation in earth formations and has a large influence on high frequency propagating waves.

Amplitude and phase are the two fundamental characteristics of a wave. As the wave passes, or propagates, through a medium the amplitude and phase change. In a wellbore, the wave begins at some source, or transmitting point, and radiates away from that point by propagation, as indicated in FIG. 1. As the wave passes one receiver point the wave has a certain amplitude and phase character which reflects the effects of the wellbore and the formation through which the wave traveled. As the wave passes a second receiver point the amplitude and phase are generally changed, reflecting the effects of that same wellbore, the same formation and the additional formation through which the wave passed. By comparing the amplitude and phase of the wave as it passes the two receivers, propagation changes due to the formation may be studied. The difference in amplitude and phase between the two received wave signals can be measured and related to the wave propagation parameters, i.e., travel time and attenuation.

The slower a wave travels in a medium, the greater will be the measured phase difference between the two spaced receiver points. Thus, phase difference can be measured and related to propagation velocity, i.e., the larger the measured phase difference the slower the wave is traveling. The multiple graphs in FIG. 1 schematically illustrate an electromagnetic wave as a function of time as the wave is propagated from a transmitter antenna T, and is received by a receiver antenna $R_2$ relatively near to the transmitter antenna, and by a receiver antenna $R_1$ relatively far from the transmitter antenna. The wave is received at the far receiver antenna $R_1$ a time delay "D" after reception at the near receiver antenna $R_2$.

From the foregoing, it can be seen that different media affect a propagating wave through two mechanisms. One such mechanism is travel time and the other is attenuation. Since the dielectric constant and the conductivity are the only parameters of the media that affect wave propagation, they should be determinable by a measurement of phase difference (travel time), amplitude ratio (attenuation), or both.

One of the major parameters in the design of an electromagnetic logging system is the frequency of operation. The higher the frequency of electromagnetic energy propagating in a medium, the more the signal is affected by the dielectric constant of the medium rather than the conductivity of the medium. Because of the well-developed relationship between formation lithology and conductivity, it is this parameter which is of the most general interest to the drilling community. Thus, a frequency is selected to produce data closely correlated to the formation conductivity, however, many of the aspects of the present invention could be included in a dielectric logging tool if desired. In the present preferred embodiment, a frequency has been used so that the signal is still predominantly influenced by the conductivity of the formation and not very strongly affected by dielectric constant variations.

Another aspect of frequency selection is that the lower the frequency of operation, the closer are the correlations between received amplitude and phase variations and the conductivity of the formation. However, the lower the frequency, the longer the wave-length and the greater are the effects of other physical factors such as the spacing between the transmitting and receiving antennas and any conductive surfaces at ground potential. A factor, $d/\lambda$, where d is the distance between an antenna and a conductive mass, such as a steel drill collar, and $\lambda$ is the wave-length of the transmitted wave, is very important. The lower the frequency, the larger the wave-length and, therefore, the smaller the $d/\lambda$ value. The smaller the $d/\lambda$ ratio the more power there is required in order to transmit sufficient energy into the formation to produce a measurable received signal due to increased coupling of the signal into the conductive mass and the signal degrading losses produced thereby. Power to operate instrumentation systems downhole in an MWD environment is at a premium and efficiency of operation is a major consideration of design. Thus, frequencies high enough to produce acceptable $d/\lambda$ ratios for acceptable power consumption levels are required.

The other aspect of ensuring a minimum $d/\lambda$ ratio is that d, the minimum distance between the antennas and the steel drill collar, involve system packaging factors which directly affect the structural reliability of the drill string. While the antennas could be mounted outside the periphery of a drill collar and protected against damage from interaction with the borehole by stabilizers, this is not practical. In order to mount these components within the peripheral borders of a collar, a recess must be formed in the outer surface of the collar. These recesses must be deep enough to surround the antenna for physical protection and still provide a sufficient spacing, d, between the antenna and the nearest surface of the conductive steel collar for an acceptable $d/\lambda$ ratio. However, the depth of the recess also affects the physical strength of the collar and, therefore, the structural reliability of the drill string. In a drill collar, there is both a twisting torque force component as well as a bending moment force which requires great strength to withstand. Cutting recesses and grooves into the surface of a collar invariably affects its strength. Thus, for a given diameter drill collar both the axial length and radial depth of the antenna receiving recesses in the collar must be carefully selected.

The environment within which the present MWD electromagnetic logging system must operate is extremely noisy from an electrical standpoint. Other electrical equipment operating downhole frequently produces spurious signals which have a strong electric component and a weak magnetic field component. The system of the present invention is configured to reduce the effect of noise from outside sources by two techniques: The use of low impedance antennas which are more sensitive to magnetic field components and less sensitive to electric fields, and the use of highly efficient electrostatic shielding means. In the preferred embodiment a single turn small loop antenna lying in a plane normal to the axis of the drill collar is used to simplyfy the mathematics of interpreting the received signal, however, other configurations of low impedance antennas could be employed. Single turn loop antennas are used to eliminate interwinding capacitance and reduce stray capacitance coupling between the antennas and the drill collar. The loops are also electrostatically shielded by a cylindrical shield open at the electrical center of the loop and antenna couplings are shielded by conductive cases. The electrostatic shield is also electrically isolated from the body of the drill collar to minimize ground currents in the shielding.

FIG. 1 shows schematically drill string 11 positioned in borehole 12 traversing earth formations 13. The drill string includes sections of drill pipe and, at the lower end of the string, drill collars to provide weight to the system. A MWD logging apparatus in accord with the present invention and designed to make the measurements discussed above is housed in drill collar or logging sub 14 or the like which is illustrated positioned in the drill string above drill bit 16. The logging sub 14 is illustrated having longitudinal passage 17 for providing drilling fluid or mud flow through the system and access to the bottom of the drill string. Such access is vital for a number of reasons which are known to those skilled in the art and, therefore, will not be discussed here. Power supply and electronic circuit components for operating the system are housed in circumferential compartments 18 in the wall of sub 14 arranged about the passage 17. Transmitter antenna 19 and receiver antennas 21 and 22 having an annular configuration are illustrated arranged about collar 14 and spaced apart to provide the comparison of travel time and attenuation as described above.

By comparison of the arrangement of components of the MWD logging sub 14 with the graph of FIG. 1, it will be appreciated that an electromagnetic wave from the transmitter antenna 19, corresponding to transmitter antenna T, penetrates surrounding formations 13. The wave propagated within the formation in the vicinity of sub 14 is first received at receiver antenna 22 which corresponds to the near receiver antenna $R_2$ spaced relatively closer along the sub to transmitter antenna 19 than receiver antenna $R_1$. The propagated wave is received later by a delay time "D" at receiver antenna 21 which corresponds to the far receiver antenna $R_1$, spaced relatively farther along the sub from transmitter antenna 19.

Referring next to FIGS. 2A and 2B of the drawings, sub 14 is schematically illustrated in greater detail. The compartment 18 is located within a recessed bore 31 and houses a power supply and data handling means such as the electronic components for the transmitter and receiver circuits as well as other circuitry, if desired.

In FIGS. 2A and 2B and the details of 2C, 2D and 2E, MWD apparatus is illustrated with transmitter antenna 19 just below the electronic compartments 18, and with receiver antenna 21, which corresponds to the far receiver $R_1$ positioned toward the bottom of sub 14.

Beginning at the lower end of recessed bore 31, as viewed in FIG. 2A, passageways 34 and 35 provide openings to pass electrical wires 36 and 37 from the transmitter and receiver circuitry in 18 to transmitter antenna 19 and receiver antennas 21 and 22, respectively.

Transmitter antenna 19 coil consists of an antenna coil 119 positioned in an annular recess 38 which is formed in the outer surface of drill collar 14. Receiver antennas 21 and 22 consists of coils 121 and 122 located in elongate annular recess 39 in the outer surface of drill collar 14 below and axially spaced from first recess 38. A durable, electrical insulator material 23 encapsulates the transmitter and receiver antenna coils to provide electrical insulation of the coils, to protect the coils from wear and to maintain the hydrostatic integrity of the drilling fluid system. One example of a useful insulator material 23 is nitrile rubber. Generally, coils 119, 121 and 122 and the additional components described below located within the recesses 38 and 39 are constructed and arranged to allow the depths of the recesses to be minimized while completely accommodating the coils and other components within the outer surface profile of the drill collar 14 and having the antenna coils spaced a minimum distance from the nearest surface of the collar. Thus, the structural strength characteristics of drill collar 14 are preserved since relatively little material is removed from the wall of the collar to form recesses 38 and 39.

Figure 3:
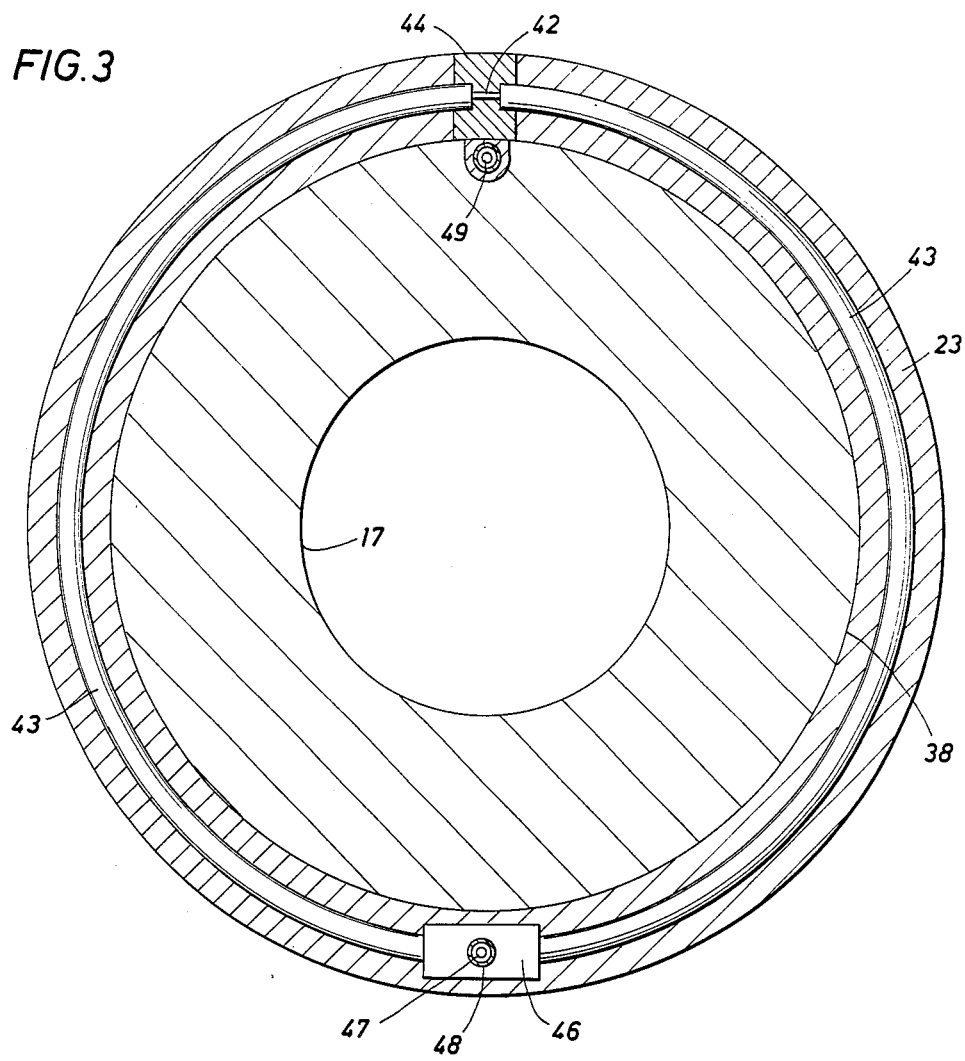
FIG. 3 is a schematic illustrative cross-sectional view taken along line 3—3 of FIG. 2A, illustrating a transmitter antenna coil in accord with the present invention.

The construction of transmitter antenna coil 119 and its mounting in recess 38 may be appreciated by reference to FIGS. 2A, 2C and 3. The coil 119 is made up of one or more wire windings 42 which are wound about the collar in recess 38. Coil 119 is of low impedance, e.g., four or less turns 42 of multifilament insulated wire. The coil 119 may be mounted in recess 38 by various means, such as suspension within an incapsulation material 23 filling recess 38 or by being positioned about an annular insulative sleeve received into recess 38. In any case a minimum space "d" between the wire windings 42 of the transmitter coil 119 and the bottom of recess 38 is maintained to preserve the signal strength of the transmitted signal. As discussed above, unless a minimum value of $d/\lambda$ is maintained for a particular operating frequency too much of the signal will be lost into the conductive steel collar to obtain a measurable signal level in the formation for practical power input values.

Windings 42 are enclosed within copper tube 43 which serves as an electrostatic shield. See FIGS. 3 and 2C. Electrostatic shield 43 is split in two halves midway along its arcurate length, with the halves being mechanically connected by insulative connector 44.

A copper coated steel case 46 is also mounted in the recess 38 and has openings in each side thereof to receive and electrically connect the ends of shield 43 and enclosed coil windings 42. Copper coated steel case 46 is electrically isolated from collar 14. A direct connection (not illustrated) between the ends of windings 42 and lead wires 36 extending from the transmitter circuitry is made in case 46 so that the lead lines continue a loop as the windings. Copper coated steel tube 47 extends from the end of passageway 34 to an opening in the top of case 46 to provide a conduit for lead wires 36. Molded insulative material 23 fills recess 38 and encapsulates case 46, tube 47, shield 43 and coil 42 to provide a protective and electrically insulating cover for transmitter antenna 19 and to maintain the hydrostatic integrity of the drilling system.

Tube 47 is in mechanical and electrical contact with the steel body of drill collar 14 at its upper end toward passageway 34. However, tube 47 is isolated from electrical contact with case 46 by an electrically insulating annular spacer 48. Thus, transmitter lead lines 36 are electrostatically shielded by tube 47 and collar 14, which is electrically grounded at the transmitter circuitry, thereby grounding the tube.

Transmitter lead lines 36 may comprise a pair of coaxial cables, with the center lead of the cables continuing as wire windings 42 of transmitter antenna coil 119. The shield lead (not illustrated) of each cable, grounded at the transmitter circuitry, is in electrical contact with each of tube shield halves 43 but is insulated from drill collar 14. Thus, windings 42 are also electrostatically shielded by case 46 and tube 43, which are at ground potential.

The transmitter antenna shield 43 aids in reducing the generation of noise in the transmitted signal while the split in tube shield 43 prevents circulating eddy currents from flowing about the tube which would interfere with the magnetic field of the propagating electromagnetic wave. Also, since grounded tube 47 is insulated from direct contact with grounded case 46, no ground currents are able to be generated in the shielding of lead wires 36 and coil windings 42. Therefore, transmitter antenna 19, including lead wires 36 and coil windings 42, is electrostatically shielded, but is not magnetically shielded.

Both the receiver antenna coils 121 and 122 are mounted about the body of drill collar 14 in the same way and in a manner similar to that of transmitter coil 119.

Annular recess 39 is sized in depth to preserve the strength of the drill collar 14 and to accommodate the receiver antenna coils and other components within the outer surface profile of the collar while having the antenna coils spaced the minimum distance "d" from the nearest conductive surface of the collar.

To enhance the sensitivity of the receiver antenna coils 121 and 122 to magnetic field components and reduce their sensitivity to the noisy electric field components low-impedance antenna coils are preferred. Although single turn loop antennas are used in the present system to reduce interwinding capacitance and capacitive coupling of noise into the antenna, other types of low impedance antennas could be employed. Also, axially symetrical loops simplify the mathematics of interpreting the received signals but with proper analysis techniques other configurations could be used.

Figure 5:
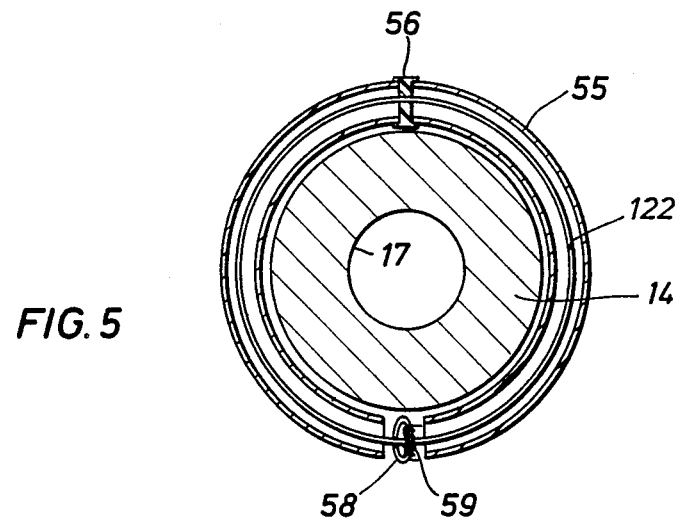
FIG. 5 is a schematic illustrative partial cross-sectional view of a receiver antenna coil, shield and coupling means in accord with the present invention.
Figure 4:
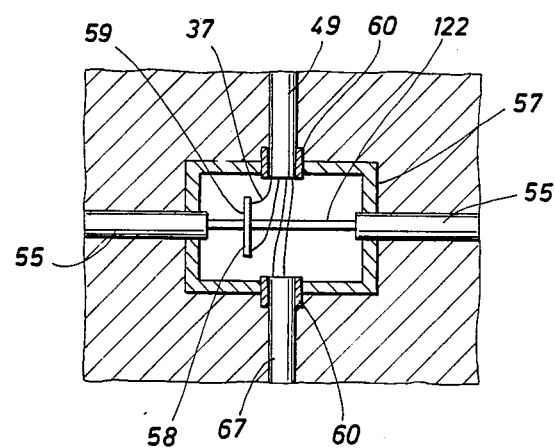
FIG. 4 is a schematic illustrative cross-sectional view taken in the direction of line 4 of FIG. 2B, showing a portion of the shielding means and a coupling for connecting a receiving antenna coil to an associated circuit.

The receiver coil 122 is enclosed within a copper tube 55 which serves as an electrostatic shield, as shown in FIGS. 2B, 4 and 5. The shield 55 is split in two halves midway along its arcuate length with the halves being mechanically connected by an insulative connector 56. As in the case of transmitter coil 119 and conductive case 46, a copper coated steel case 57 is mounted in but electrically isolated from the annular recess 39 and has openings in each side thereof to receive the ends of shield 55 and enclosed coil 122. Mounted within the case 57 is a transformer for inductively coupling the receiver antenna coil 122 to the receiver circuitry.

To maximize the energy coupled from the receiver antenna to the receiver input circuitry, a high efficiency transformer such as a ferrite toroidal transformer is preferred. As shown in FIGS. 4 and 5, a ring 58 of high magnetic permeability material, which may be a ferromagnetic material such as ferrite or powdered iron, is positioned about the receiver coil 121 and wound with a toroidal coil 59. The output of the coil 59 couples the received signal from the antenna coil 121 to the transmission line connected to the receiver circuit components (not shown). The impedance of the coil 59 is selected to match the impedances between the antenna coil 121 and the receiver input for maximum signal transfer. The coil 121 impedance may be on the order of a few ohms while the transmission line leading to the receiver circuit may be on the order of 50 ohms.

Receiver lead wires 37 include two coaxial cables extending from the receiver circuitry through a sub passageway 35 and a copper coated steel shielding tube 49 to connector case 57. As in the case of transmitter antenna coil 119, the outer shielding leads of coaxial cables 37, which are grounded at the receiver circuitry, are electrically connected to conductive case 57 and, therefore, to tube shield halves 55. The center leads of receiver coaxial cables 37 are connected to opposite ends of toroidal coil 59. As illustrated in FIG. 4, shielding tube 49 is mechanically connected to case 57 but is electrically isolated therefrom by insulating spacer 60. As in the case of shielding tube 47, shielding tube 49 is mechanically and electrically connected to the wall of drill collar 14 at the upper end of tube 49 toward the bottom of recess 31. Consequently, the receiver antenna leads and antenna coil 122 and 121 are electrostatically shielded by separately grounded tubing shield 49 and 67 enclosing lead cables 37 and the combination of cases 57 and tube halves 55, enclosing antenna coils 122 and 121, respectively. The split in copper shielding tube halves 55 prevents eddy currents from circulating about the tube which would interfere with reception of magnetic field components of the propagating waves by coils 122 and 121. Further, since grounded shield tubes 49 and 67 (enclosing lead cables for receive antenna coil 121) are insulated from direct contact with grounded cases 57, no ground currents can be generated in the shielding of lead wires 37. The receiver antenna coils 121 and 122 and their coupling components are carefully electrostatically shielded from noise, while remaining exposed to the magnetic field components of the electromagnetic waves generated by transmitter antenna 19 and propagated through the surrounding formations 13.

Electromagnetic waves generated by transmitter antenna 19 and propagated through surrounding formations 13 are incident on receiver antennas 22 and 21, whereby the varying magnetic fields of the waves interact with coils 122 and 121 of respective receiver antennas 22 and 21 to induce electric currents in the windings. Low impedance antennas, such as the relatively large wire, single loop preferred construction of receiver coils 122 and 121 exhibit minimized impedance to such magnetic field induced current flow while remaining less susceptible to noise due to varying electric fields. The current flow in receiver coil 122 generates electromagnetic fields in the plane of the corresponding ferritomagnetic ring 58 and toroidal coupling coil 59, thus providing a highly efficient inductive transformer coupling of the toroidal coil to the antenna coil. Similarly, a transformer toroidal coil is coupled to antenna coil 121. Voltages varying in accord with the field variations of the electromagnetic wave incident on the receiver antenna coil 121 are thus generated across the output of its coupling coil 59, and transmitted therefrom to receiver input circuitry. Similarly, voltages are generated due to electromagnetic waves incident upon receive antenna coil 122. The pair of received voltages are amplified and converted to lower frequencies for ease of handling in the electronics section.

In one preferred embodiment of the system of the invention, a drill collar having an outside diameter of 7 inches was formed with cylindrical annular recesses having a diameter of 5.75 inches. Antenna coils having an inner diameter of 6.2 inches were arranged in the recesses to produce a minimum distance between antenna and drill collar of about 0.22 inches. This system performed well downhole at an operating frequency of about 2 MHz.

Next referring to FIG. 6 of the drawings, an alternative arrangement is illustrated for the transmitting and receiving antenna coils. The upper portions of sub 80, housing circuitry component and power supply section 83, are similar to those of sub 14 set out with respect to FIG. 2A. Transmitter antenna coil 84 and receiver antenna coils 85 and 86, however, are illustrated in eccentric longitudinal recesses 81 and 82, respectively, on the outer wall surface of drill collar 80. Each coil 84, 85 and 86 typically includes a plurality of turns wound about a longitudinal core (not illustrated) and arranged parallel to the longitudinal axis of drill collar 80. The cores and coils are made as small as possible to limit the depth of recesses 81 and 82 needed to house and protect the coil assemblies. The coils are spaced from the steel body of drill collar 80 a minimum distance "d" to preserve an adequate $d/\lambda$ ratio for efficient operation and covered with an encapsulating medium 87 to allow magnetic fields to encircle the coils, to protect the coils and to maintain the hydrostatic integrity of the drilling fluid system. Appropriate electrostatic shielding (not illustrated) is also provided in the system, preferably as described above with respect to FIGS. 2A and 2B.

Referring now to FIG. 7 of the drawings, a schematic circuit diagram is illustrated for providing a system to make formation resistivity measurements using the apparatus heretofore described. Such data handling means are included in the electronics section in drill collars 14 or 80, although the embodiment of FIGS. 2A and 2B will be referred to hereafter. The output of the circuit shown in FIG. 7 may be recorded in the electronics section or may be fed by a telemetry system (not illustrated) to the surface for concurrent processing and readout at the surface. In any event, the transmitter is operated by power supply 24 at a frequency preferably in the range of 500 KHz to 10 MHz to provide an electromagnetic wave for output from the transmitter antenna coil 119. This wave is propagated through the environment, including earth formations 13 surrounding the borehole, to receiver antenna coils 122 and 121 of receivers 22 and 21, respectively, located at spaced longitudinal distances on the collar. The receiver antenna coils are coupled to the respective electronic receiver components which are driven by local oscillator 90 operating at a frequency within several KHz of the transmitted frequency to generate lower frequency output signals which are more easily handled. For example, transmitter 19 is illustrated operating at 2 MHz and oscillator 90 is operating at 1.998 MHz. The outputs from receivers 22 and 21 are then fed to a phase comparator 91 and/or amplitude measuring circuits 92 and 93 which are in turn coupled to a ratio circuit 94 to measure signal phase shift and attenuator all in accordance with the teaching of the aforementioned prior art patents.

In the operation of the system heretofore described, the signal emanates from a source, transmitter antenna 19, and travels away from it. The steel of drill collar 14 has a high permeability and is located to the inside of the source so that the steel only causes small effects on the signal as long as a minimum distance d from antenna to drill collar is maintained so that an adequate $d/\lambda$ ratio is maintained. The signal that does travel along the steel is highly attenuated, so that the signal received at the receiver antenna coils must come from the region outside collar 14, i.e. earth formations 13 as long as the receiver antennas coils 121 and 122 are spaced the distance "d" from the surface of the collar.

The foregoing description of the invention has been directed primarily to a particular preferred embodiment in accordance with the requirements of the patent statutes and for purposes of explanation and illustration. It will be apparent, however, to those skilled in the art that many modifications and changes in the specifically described and illustrated apparatus and method may be made without departing from the scope and spirit of the invention. For example, while the disclosure of the system has been described primarily with regard to resistivity measurements, particular coil configurations, and specific frequencies and frequency ranges, it may be appreciated from the present description and illustrations that other measurements, coil configurations, frequencies and the like could be used without departing from the present invention in its broadest aspects. Therefore, the invention is not restricted to the particular form of construction illustrated and described, but covers all modifications which may fall within the scope of the following claims.

It is Applicants' intention in the following claims to cover such modifications and variations as fall within the true spirit and scope of the invention.

What is claimed is:

1. A method for use in a borehole for reducing interference and for enhancing an electromagnetic signal received by receiving means on a tubular housing member, comprising:

transmitting an electromagnetic signal into a surrounding formation from a transmitting means arranged in a recess on the exterior of but insulated from a tubular, electrically conductive housing means threaded at each end for threaded engagement in a drill string;

receiving said electromagnetic signal from said surrounding formation at a receiving means, said receiving means spaced longitudinally from said transmitting means and arranged in a recess on the exterior of but insulated from said housing means;

reducing the coupling to said receiving means of the electric field component of the received signal, including noise, by electrostatically, but not magnetically, shielding substantially all of said receiving means;

picking up the received signals from said receiving means by inductive current coupling means positioned within the shielded portion of said receiving means and cooperating with said receiving means; and communicating a signal indicative of the signal received by said receiving means to a data handling means located within said housing means.

2. The method of claim 1 comprising receiving said signal in said receiving means with a low impedance antenna and picking up said signal from said antenna onto a wire coil forming a first toroidal winding about a first ring means of high magnetic permeability and through the center of which said antenna passes.

3. The method of claim 1 comprising receiving electromagnetic signals from a surrounding formation at a plurality of receiving means each substantially electrostatically, but not magnetically, shielded and spaced longitudinally from said transmitting means, picking up said received signals by a plurality of inductive current coupling means cooperating with each receiving means and transmitting said received signals to a data handling means.

4. An apparatus suitable for measuring while drilling formation parameters about a borehole traversing earth formations and containing drilling fluids, comprising:

a tubular, electrically conductive drill collar threaded at each end for threaded engagement in a string of drill pipe above the drill bit and including a longitudinal passage suitable for conveying drilling fluids therethrough;

means for transmitting electromagnetic energy into the space surrounding said drill collar, said transmitting means insulated from but disposed on the exterior of said drill collar;

first means for receiving electromagnetic energy from the space surrounding said drill collar, said first receiving means longitudinally spaced a first distance from said transmitting means and insulated from but disposed on the exterior of said drill collar;

a first receiver electrostatic shield substantially surrounding said first receiving means to reduce the electric field component of the received electromagnetic energy, including electrical noise, said first shield comprising conductive elements substantially surrounding said receiving means, insulated from said drill collar, having at least one gap to prevent eddy currents therein and maintained at the ground potential of said receiving means; and first inductive coupling means disposed within said electrostatic shield and inductively coupled to said receiving means for coupling the signal from said receiving means to an electrical conductor for communicating to a data handling means.

5. The apparatus of claim 4 wherein said receiving means is a receiving antenna of the low impedance type.

6. The apparatus of claim 4 which also includes:
   data handling means disposed within said drill collar.

7. The apparatus of claim 4 wherein said transmitting and receiving means each comprise an annular antenna, said antennas, respectively disposed within first and second longitudinally spaced, annular recesses about the exterior surface of said drill collar.

8. The apparatus of claim 7 wherein said first and second longitudinally spaced recesses extend to a depth sufficient to protect components located therein from damage but not sufficient to appreciably impair the mechanical integrity of said drill collar.

9. The apparatus of claim 8 wherein said conductive elements of said first receiver electrostatic shield comprise a pair of semicircular conductive shield tubes surrounding the receiving antenna, said tubes having a first pair of ends spaced from one another at the electrical center of the antenna; and a conductive case mounted within the second recess and insulated from said housing and having a pair of opposed openings in the side walls thereof through which the receiving antenna extends, the second pair of ends of the semicircular conductive shield tubes being joined to said conductive case around the opposed side wall openings therein to form an electrostatic shield substantially enclosing the receiving antenna to reduce the coupling of electrical noise from conductive elements into the antenna.

10. The apparatus of claim 9 which also includes:
    a toroidal ferromagnetic core transformer for matching the impedance between the receiving antenna and the receiver.

11. The apparatus of claim 9 wherein said receiving antenna comprises a single winding coil receiving antenna.

12. The apparatus of claim 9 wherein said inductive signal coupling means comprises a ring means having a toroidal winding of conductive wire about said ring means and said receiving antenna extends through the opening in said ring means.

13. The apparatus of claim 12 wherein the material of said ring means is selected from the group consisting of ferrite and powdered iron.

14. The apparatus of claim 4 further comprising:
a transmitter electrostatic shield substantially surrounding said transmitting means to reduce electrical noise from ground loop currents, said transmitter shield comprising conductive elements substantially surrounding said transmitting means, insulated from said drill collar, having at least one gap to prevent eddy currents therein and maintained at the ground potential of said transmitting means.

15. The apparatus of claim 14 further comprising
a second means for receiving electromagnetic energy from the space surrounding said drill collar, said second receiving means longitudinally spaced a second distance from said transmitting means and insulated from but disposed on the exterior of said drill collar;
a second receiver electrostatic shield substantially surrounding said second receiving means to reduce electrical noise from ground loop currents, said second shield comprising conductive elements substantially surrounding said receiving means, insulated from said drill collar, having at least one gap to prevent eddy currents therein and maintained at the ground potential of said receiving means; and
a second inductive coupling means disposed within said electrostatic shield for coupling the signal from said receiving means to an electrical conductor for communicating to a data handling means.

16. The apparatus of claim 15 wherein said conductive elements of said second receiver electrostatic shield comprise:
a pair of semicircular conductive shield tubes surrounding a second receiving antenna, said tubes having a first pair of ends spaced from one another at the electrical center of the antenna; and
a conductive case mounted within the second recess and insulated from said housing and having a pair of opposed openings in the side walls thereof through which said second receiving antenna extends, the second pair of ends of the semicircular conductive shield tubes being joined to said conductive case around the opposed side wall openings therein to form an electrostatic shield substantially enclosing said second receiving antenna to reduce the coupling of electrical noise from conductive elements into said second antenna.

17. The apparatus of claim 16 wherein all of said conductive elements are copper.

18. The apparatus of claim 14 wherein said conductive elements of said transmitter electrostatic shield comprise:
a pair of semicircular conductive shield tubes surrounding the transmitting antenna, said tubes having a first pair of ends spaced from one another at the electrical center of the antenna; and
a conductive case mounted within the first recess and insulated from said housing and having a pair of opposed openings in the side walls thereof through which the circular loop transmitting antenna extends, the second pair of ends of the semicircular conductive shield tubes being joined to said conductive case around the opposed side wall openings therein to form an electrostatic shield substantially enclosing the transmitting antenna to reduce the coupling of electrical noise into the transmitted signal.

19. The apparatus of claim 4 wherein said receiving antenna has an impedance less than about 100 ohms.

20. An apparatus suitable for measuring a formation parameter about a borehole traversing an earth formation and containing drilling fluid, comprising:
a tubular, electrically conductive housing means threaded at each end for threaded engagement in a drill string above the drill bit and including a longitudinal passage suitable for conveying drilling fluids therethrough;
means for transmitting electromagnetic energy into the formation surrounding said housing means, said transmitting means insulated from but disposed about the exterior of said housing means;
first receiving means for receiving electromagnetic energy from said formation, said first receiving means longitudinally spaced a first distance from said transmitting means and insulated from but disposed about the exterior of said housing means;
first shield means substantially surrounding said first receiving means for electrically, but not magnetically, shielding said first receiving means by reducing the coupling of the electric field component of the received signal, including noise, to said first receiving means, said first shield means comprising:
a pair of first conductive shield tubes substantially surrounding said first receiving means and within which said first receiving means is disposed, said first tubes each having a first end, said first ends spaced from one another with a first gap to prevent eddy currents therein, each having a second end, said second ends joined to a first conductive case at a pair of opposed openings in the side walls of said case through which said first receiving means extends, said first shield tubes and said first conductive case insulated from said housing means,
means mounted within said first conductive case for inductively coupling the signal from said first receiving means to an electrical conductor leading to signal handling means, and
means for electrically connecting said first shield tubes and said first conductive case to ground potential while insulating them from said conductive housing to reduce electrical noise from ground loop currents therein.

21. The apparatus of claim 20 wherein said housing means is a tubular, steel pipe section.

22. The apparatus of claim 21 wherein said conductive shield tubes are semi-circular and said gap between said pair of first ends is substantially at the electrical center of said first receiving means.

23. The apparatus of claim 22 further comprising a second electrostatically shielded receiving means longitudinally spaced a second distance from said transmitting means and insulated from but disposed about the exterior of said housing means and wherein said second receiving means and said second shield means comprise components substantially identical to those of said first receiving means and said first shield means.

24. The apparatus of claim 23 wherein said first and second distances are different.

25. The method of claim 1 wherein said housing means is both electrically conductive and magnetic.

26. The method of claim 25 wherein said housing means is a steel drill collar.

27. The apparatus of claim 4 wherein said drill collar is both electrically conductive and magnetic.

28. The apparatus of claim 27 wherein said drill collar is steel.

29. The apparatus of claim 20 wherein said housing means is both electrically conductive and magnetic.

30. The apparatus of claim 29 wherein said housing means is a steel drill collar.

* * * * *